Aug. 19, 1969  A. WEINER ET AL  3,461,781
EXPANSION JOINTS AND WATERSTOPS
Filed Dec. 15, 1966

INVENTORS
ALBERT WEINER &
ANTHONY A. STYNER

BY *Harvey S. Boyd*
ATTORNEY

# United States Patent Office 3,461,781
Patented Aug. 19, 1969

3,461,781
EXPANSION JOINTS AND WATERSTOPS
Albert Weiner, 12-21 Bellair Ave., Fair Lawn, N.J. 07410, and Anthony A. Styner, 405 W. 57th St., New York, N.Y. 10019
Filed Dec. 15, 1966, Ser. No. 602,459
Int. Cl. E01c 11/10
U.S. Cl. 94—18      11 Claims

ABSTRACT OF THE DISCLOSURE

This invention relates to expansion and contraction joints or gaskets, in concrete or other structural materials, and more particularly to waterstops capable of conforming to their surroundings under all possible conditions without an unreasonable amount of fatigue or degradation with the passage of time or variation of temperature, or gaskets to join tightly abutting structural units. The joint or gasket contemplated in this invention incorporates a pre-compressed core surrounded by a destructible or disintegrating material. Upon placement of the joint, gasket, waterstop, or insert in a suitable environment and in the desired position the destructible material decomposes leaving the pre-compressed core free to expand against the surrounding environment, filling possible contours and voids therein to seal the joint in its surroundings.

---

The invention described herein may be manufactured and used by or for the Government for governmental purposes without the payment to us of any royalty thereon.

Accordingly, it is an object of this invention to provide an insert including a waterstop which will expand or contract with the shrinkage or expansion of its surroundings.

It is another object to provide an expansion joint which will effectively seal a crack in a concrete structure against water intrusion from above or from the pumping action of the sub-grade by maintaining pressure contact against the walls of the crack.

It is another object to provide a gasket for insertion between structural units which will expand at a predetermined time, after insertion, against said units to provide a pressure seal.

It is still another object to provide a cheap and durable expansion joint, having a waterproof capability, for insertion into a plastic surrounding media prior to setting which will expand against the media after setting to provide a pressure seal.

These and other objects will become apparent with reference to the drawings and following description wherein.

The joint of this invention is formed through the temporary restraint of a compressible core 1. This core 1, may be made from a variety of material depending on its intended use. If the core is to be used as a waterstop, a high degree of durability is essential. For example, a sleeve, 2, may be wrapped around a compressed cellular material, 3, such as open-celled polyurethane, or the sleeve can be partly filled with a swelling agent, such as bentonite.

Figure 3:
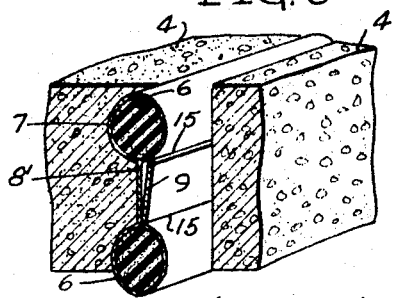
FIG. 3 illustrates a type of joint having an upper and a lower seal.

If a joint is to be inserted between sections of concrete paving, 4, the core, 1, may be open or closed-cell ½ inch thick, flexible polyurethane, 3, surrounded by a thin flexible Mylar sleeve, 2, as shown in FIG. 3.

Figure 4:
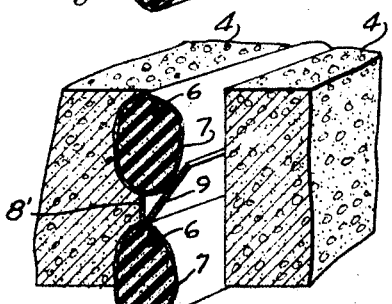
FIG. 4 shows the joint of FIG. 3 in an expanded configuration.

FIGS. 3 and 4 depict two cylindrical, pre-compressed cores, 6, and constraining sleeves, 7, used as a double seal. The sleeves 7 may be connected at overlapping edges 8'. The overlapping portion, 8', may also have a stiffened insert, 9, to insure the vertical separation desired between the cores, 6. A joint may then be a series of interconnected cores having overlapped sleeves.

Other materials suitable for sleeves are nylon, polypropylene, polyethylene, and neoprene and butyl rubber.

The core, 1, may be any compressible or resilient material such as neoprene or foamed rubber, polypropylene, polyurethane, and other flexible materials which can be made in cellular form, or, any compressible shape. If a cellular material is used in the core it may be desirable to treat it with a conventional waterproofing. However, the joint may be made watertight merely by inclosing the core in an impervious sleeve.

If the joint is to be used between sections of concrete it may be desirable to lubricate the sleeve. Poly-butylene, pitch, or asphalt or any other conventional lubricant may be used.

Figure 5:
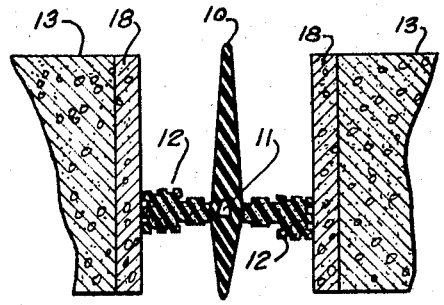
FIG. 5 is a front view of another type of joint with its constraining material.

Neoprene rubber, 10, may be used as a core. The design of a rubber core should incorporate voids, 11, and arms, 12, constructed of a material readily compressible as shown in FIG. 5. The natural resilience of arms, 12, supplements the expansion of core 10, when the constraining material decomposes to make a water-tight, pressure joint between the adjacent walls of material, 13, in FIGS. 5 and 6.

The destructible constraining material used to compress the joint core, 1, may be a wide variety of materials. A constraining material may be utilized which is subject to chemical attack by a constituent of the structural material surrounding the joint. In the alternative the constraining material may be impregnated with a decomposing agent prior to its insertion into a structural material to form a joint and waterstop, or between structural units to form a gasket.

If the structural material is concrete it may be desirable to use fiber glass, silk, calcium alginate, aluminum foil or aluminum or soft iron staples. These materials decompose slowly in the alkaline environment of, for example, Portland cement. If a sleeve 2 is used, fiber glass, silk, or calcium alginate thread, 15, may be stitched into the sleeve, 2, or wound around the core, 1, or sleeve, 2, to constrain the core 1.

It should be noted that the alkalinity of cast concrete is around pH 10, and that this is sufficient to degrade, for example, calcium alginate at ambient temperatures. Important factors controlling degradation however are the length of time of exposure to unset concrete having a water content of above 10 percent; whether yarn, thread, or fabric is to be used; and the subsequent weather exposure. Also, a high sodium ion concentration or the presence of sequestrating agents can cause calcium alginate to degrade at a neutral pH in less than three hours.

If a substance that normally decomposes in an alkaline solution is used as a constraint for a joint in an inert structural material the constraining material may be impregnated or coated with an alkaline solution of, for instance, sodium carbonate, sodium hydroxide, an alkylamine, or other solution of about pH 10 prior to insertion of the joint in the structure.

Those skilled in the art may also select the disintegrating agent from a wide variety of conventional slow-acting acids to impregnate the constraining material for decomposition.

The time for destruction of the constraint will vary depending upon whether the alkalinity of surrounding concrete is used as the destructive agent, without any further modification; or, one of the wide variety of materials available for pre-treatment of the constraint before emplacement is used. The period of time, could vary from practically instantaneous to weeks or months. Those skilled in the art may select any conventional material in a liquid or paste form to weaken or destroy the constraint.

Figure 1:
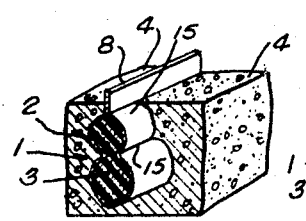
FIG. 1 is a perspective view of the joint of this invention in concrete prior to the setting of the concrete and the destruction of the constraining material.
Figure 2:
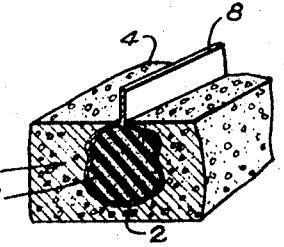
FIG. 2 shows the joint of FIG. 1 after it has expanded to form a pressure seal.

FIGS. 1, 2, 3, and 4 illustrate substantially circular joints in which the core, 1, or, 6, is surrounded by a sleeve, 2, or, 7. The constraining material is the stitches, 15, which may run parallel to the core 1, as shown in FIG. 3, and in addition the stitching, 15, may pass through the core, 1, as shown in FIG. 1.

If the joint is to be a sheet, rather than a cylinder the stitching may pass through the core in a quilting fashion by stitching a diamond shaped pattern instead of the parallel pattern of FIGS. 1, 2, 3, and 4.

Figure 9:
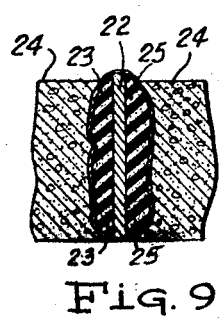
FIG. 9 shows still another type of joint in a constrained condition.
Figure 10:
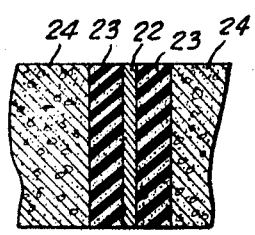
FIG. 10 shows the joint of FIG. 9, expanded, after the disintegration of the constraining material.

FIGS. 9 and 10 illustrate another method of constructing a flat sheet insert. A flat sheet of rigid material, 22, may be faced with compressible material, 23. As shown in FIG. 9 the facing, 23, may be compressed against sheet, 22, and inserted between adjacent bodies, 24. When the constraint, 25, deteriorates and weakens the compressed facing, 23, expands against bodies, 24, as shown in FIG. 10.

Cotton thread or a paper sheath may also be used as a constraint, but these materials should be impregnated with a decomposing material, such as the enzyme cellulose amylase for converting cellulose to sugar in order to accomplish the decomposition.

It is also possible to use a sleeve, 2, made entirely of calcium alginate, silk, impregnated cotton, or paper, or aluminum foil. In this case the entire sleeve constitutes a decomposing constraint when the joint is inserted into an alkaline structural material, such as concrete. It should be noted however, that when the sleeve decomposes the expanded core, 1, will be exposed to moisture, and therefore should be pre-treated with a waterproofing material.

FIGS. 5, 6, 7, and 8, depict types of neoprene waterstops. The core itself, 10, is designed with voids, 11, to make it more readily compressible.

Figure 6:
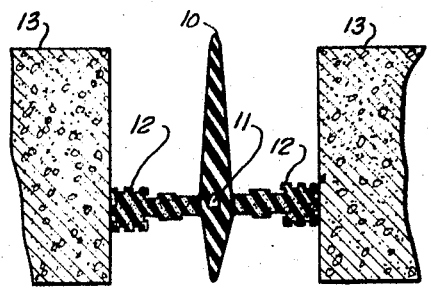
FIG. 6 shows the joint of FIG. 5 in an expanded configuration.

In FIGS. 5 and 6, the arms, 12, are compressed by the constraint and expand horizontally as the constraint weakens.

Figure 7:
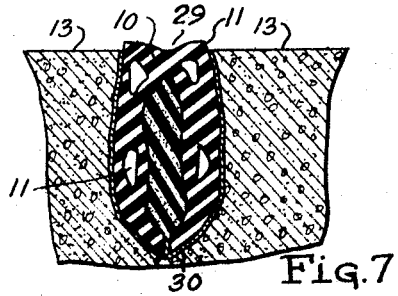
FIG. 7 shows yet another type of a joint in a constrained condition prior to the disintegration of the constraining material.
Figure 8:
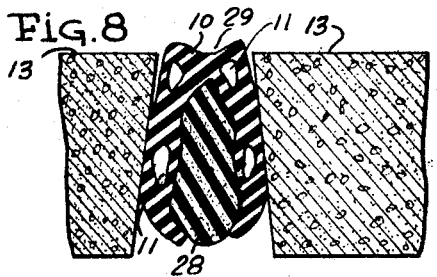
FIG. 8 shows the joint of FIG. 7 in an expanded condition.

In FIGS. 7 and 8, a compressible center, 28 is placed in a conventional neoprene waterstop, 29, and aluminum foil, 30, is used as a constraint, 28, when it is glued in a conventional manner around waterstops, 29. When the foil, 30, degrades, center, 28, expands forcing the waterstop against adjacent concrete masses, 13.

Staples, foil, or decomposing thread may be used to hold arms, 12, or center, 28, in the compressed condition of FIGS. 5 and 7, when the joint is inserted in plastic concrete.

When the constraining material weakens, the arms, 12, or the legs of stop, 29, spring into contact with preset sections of concrete creating a pressure joint.

A preset disintegrating cementitious material as described in our copending application Ser. No. 560,380, filed June 21, 1966, now U.S. Patent No. 3,390,496, such as a 95 to 5 percent by weight combination of bentonite and paradichloro benzene, may also be used as a constraining material. The material, 18, is allowed to set in a paper or light-gauge metal joint mold, and then inserted in plastic concrete. After the concrete sets the material will disintegrate due to the sublimation of paradichloro benzene and the accompanying loss of internal cohesion in the constraining material. The disintegrating cementitious insert may be removed after sufficiently decomposed to permit the interjection of a precompressed joint, or as pictured in FIGS. 5 and 6, the insert may be originally used with a constrained core, 10, and allowed to disintegrate; whereupon the arms, 12, expand and seal the joint without the removal of the constraining material.

This invention comprises the use of any self-destructible constraining material with a compressible core to form a joint or gasket. A sleeve need not be used, but if desired, can be used to waterproof, or protect the core, or to provide an overlapping edge whereby successive cores may be joined to form a single joint.

In addition to the materials recited in the examples herein this invention is intended to include interchanging or substituting other materials of obvious functional similarity.

We claim:
1. A joint for sealing voids between mutually spaced material masses comprising:
   (a) a precompressed, resilient core having a normal volume greater than the voids and disposed between the masses; and
   (b) a decomposing constraining material, said material comprising a preset, disintegrating cementitious mixture having a cementitious component and a volatile component, said mixture disintegrating as the volatile component sublimes to weaken the constraining material and allow said precompressed core to expand to fill the voids and join the spaced masses.
2. The joint of claim 1 wherein the core comprises:
   (a) a rigid base; and
   (b) a precompressed, resilient layer attached to at least one external surface of said base and conforming to the configuration of said surface so that said disintegrating constraining material cooperates with said base to hold said layer in a compressed state against said external surface of said base until said constraining material disintegrates.
3. A joint for sealing voids between mutually spaced material masses comprising:
   (a) a precompressed, resilient core having a normal volume greater than the voids and disposed between the masses; and
   (b) a decomposing constraining material, said material comprising an alkaline soluble material coated with an alkaline solution for dissolving said constraining material allowing the precompressed core to expand to fill the voids and join the spaced masses.
4. The joint of claim 3 wherein the core comprises:
   (a) a rigid base; and
   (b) a precompressed, resilient layer attached to at least one external surface of said base and conforming to the configuration of said surface so that said decomposing constraining material cooperates with the said base to hold said layer against said external surface of said base until said constraining material dissolves.
5. An expansion joint for placement between mutually spaced wet, concrete masses before the masses are set comprising:
   (a) a precompressed resilient core disposed in a preselected position between the masses, said core normally dimensioned to occupy a greater space than that between the masses; and
   (b) soluble constraining means for compressing said core, said constraining means combining with the alkaline in said wet concrete to dissolve when said concrete sets allowing said core to expand against the concrete masses.
6. The joint of claim 5 wherein said constraining material comprises:
   an envelope of a preselected configuration surrounding said core, said envelope being constructed of a material selected from the group consisting of calcium alginate, silk, aluminum, cotton, rayon, acetate, and fiber glass.

7. The joint of claim 5 wherein the core is encased in an inert, water impervious sleeve and said constraining material comprises:
   a sleeve fastener means soluble in wet concrete and attached to said sleeve for restricting the internal volume of said sleeve to compress said core, said fastener being disposed to contact said wet masses and decomposing when said concrete sets.

8. The joint of claim 7 wherein the fastener is constructed from a material selected from the group consisting of calcium alginate, silk, fiber glass, aluminum, and iron.

9. The joint of claim 5 further comprising a second precompressed, resilient core said core normally dimensioned to occupy a space greater than that between the masses and a second constraining means soluble in wet concrete, said second core disposed between the concrete masses, said second constraining means surrounding said second core and connected to said first constraining means, compressing said second core until the masses set, and subsequently dissolving to allow said second core to expand against the masses, said cores being mutually spaced in a predetermined position between the masses.

10. A joint for sealing voids between mutually spaced material masses comprising:
   (a) a precompressed, resilient core having a normal volume greater than the voids and disposed between the masses; and
   (b) a decomposing constraining material said material comprising an acid soluble material coated with an acidic agent for dissolving said constraining material allowing the precompressed core to expand to fill the voids and join the spaced masses.

11. The joint of claim 10 wherein the core comprises:
   (a) a rigid base; and
   (b) a precompressed, resilient layer attached to at least one external surface of said base and conforming to the configuration of said surface so that said decomposing constraining material cooperates with the said base to hold said layer against said external surface of said base until said constraining material dissolves.

References Cited

UNITED STATES PATENTS

| | | |
|---|---|---|
| 2,167,550 | 7/1939 | Jenkins. |
| 2,240,787 | 6/1941 | Kinzer _____ 94—18 |

FOREIGN PATENTS

| | | |
|---|---|---|
| 999,064 | 7/1965 | Great Britain. |

JACOB L. NACKENOFF, Primary Examiner